Nov. 17, 1942.　　　J. MORKOSKI ET AL　　　2,302,502
TRACTOR-MOUNTED IMPLEMENT
Filed May 10, 1941　　　2 Sheets-Sheet 1
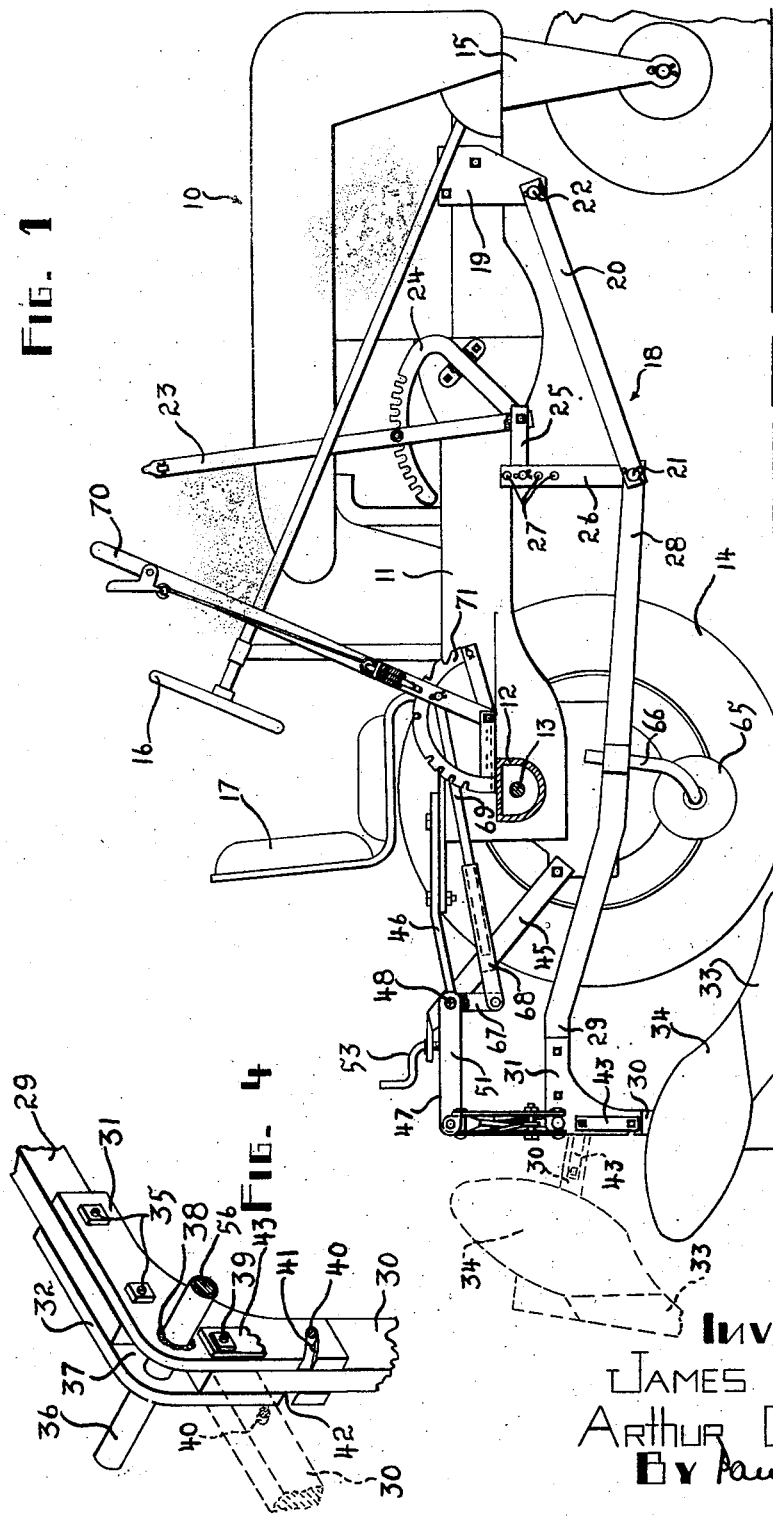
INVENTORS
JAMES MORKOSKI
ARTHUR G. EVANS
BY Paul O. Pippel
ATTY

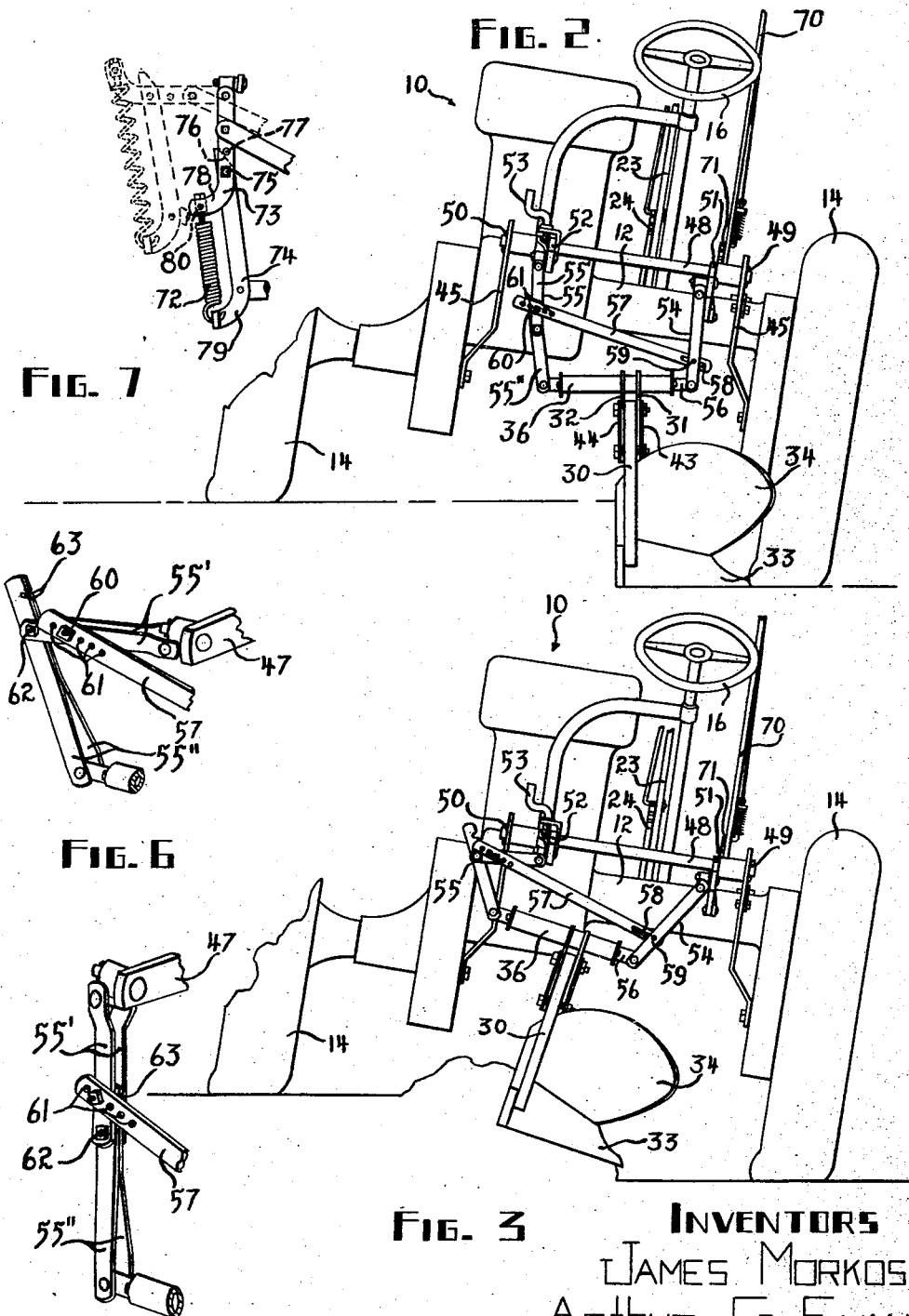

Patented Nov. 17, 1942

2,302,502

UNITED STATES PATENT OFFICE 2,302,502

TRACTOR-MOUNTED IMPLEMENT

James Morkoski and Arthur G. Evans, Canton, Ill., assignors to International Harvester Company, a corporation of New Jersey Application May 10, 1941, Serial No. 392,892

5 Claims. (Cl. 97—47)

This invention relates to tractor-mounted implements and more particularly to the means for connecting implements with the tractor or other draft-supporting structure.

Heretofore, plow bottoms or working tools have been connected to their respective beam structures in such a manner as to yield or release rearwardly upon the working tool striking a head-on obstruction to thereby prevent breakage of the working tools or the tractor which carries the same. There are times, however, when the force acting upon the working tool, resulting from the encountering of an obstruction, is in a lateral direction, such as when the obstruction bears against the wing of the plow, whereupon, if some means is not provided to relieve this lateral shock, breakage due to a lateral strain will result.

It is, therefore, the principal object of the present invention to provide in an implement means for connecting the implement or plow to the tractor, and means which is releasable to allow the plow to slip sidewise or laterally upon receiving a lateral thrust due to the encountering of an obstruction in its path.

It is another object to provide such a releasable means which is of simple construction and which does not particularly disassemble the plow upon encountering the obstruction.

It is still another object of the invention to provide a construction wherein the releasable means can be included in the usual lateral stabilizer connections between the plow and the tractor.

According to the present invention, the connection of the plow with the tractor has been provided with a jointed link which is normally held with its sections in alinement by friction or by a spring biasing means. This link serves to support the plow and, under normal conditions, is practically solid and normally serves to aid in preventing lateral movement of the plow with respect to the tractor. When the obstruction is encountered, the link sections will be buckled, due to the excess strain, and the plow will slip sidewise to avoid the obstruction in its path. This jointed link depends from the usual stabilizer means carried by the tractor. The depending links are connected to have lateral swinging movement, but are limited in the amount of movement by a diagonally arranged bracing means connected between the two depending links of the stabilizer. One end of the bracing means is connected to one of the jointed sections and thereby serves to exert force against the juncture of the to sections of the link when the plow encounters an obstruction.

For other objects and for a better understanding of the invention, reference may be had to the following detailed description taken in connection with the accompanying drawings, in which:

Figure 1 is a side view in elevation of the tractor, implement, and the connections embodying the features of the present invention, the plow resting on the ground prior to the plowing operation;

Figure 2 is a rear view of the tractor and of the implement with the plow bottom in its plowing position;

Figure 3 is a rear view in elevation of the tractor and of the implement with the jointed link collapsed to allow the plow bottom to pass the obstruction;

Figure 4 is a detail perspective view of the connection of the plow bottom stub beam to the main longitudinally extending beam;

Figure 5 is an enlarged detail view of the link means with its elements in their alined position;

Figure 6 is likewise an enlarged view of the link means after the same has been released; and, Figure 7 is a view in elevation of a modified form of link construction and using a toggle spring.

Referring now particularly to Figures 1, 2, and 3, there is shown a tractor or tool-supporting draft structure 10 having a body portion 11 and a transverse rear axle structure 12, with a rear axle 13 therein serving to drive the traction wheels 14. The forward part of the portion 11 of the tractor is supported on the steerable bolster structure 15 adapted to be operated by a steering mechanism 16 from an operator's station 17 on the rear axle structure. On the body portion intermediate the steerable structure and the rear wheels is connected an adjustable draft structure indicated generally at 18. This draft structure includes depending plates 19 rigid on the tractor and from which there extends rearwardly extending, longitudinal members 20, and having mounted in their rear ends a transversely extending shaft pin 21. Since the members 20 are pivotally connected to the depending members 19, as indicated at 22, the shaft and the members may be adjustable, and this is accomplished by means of a manual adjusting mechanism including a hand lever 23 accessible to the operator's station 17 and adapted to be operated over a quadrant 24. Rigid with this lever 23 is a rearwardly extending arm 25, to which the transverse shaft pin 21 is connected by means of a link 26 having holes 27 in its upper end for giving in effect to the link 26 a change of length when it is desired that the shaft pin 21 be located at vertical positions not made possible by the mere operating of the lever 23 over the quadrant 24. To the shaft pin 21 is connected a longitudinally extending tool beam means 28, and the connection with the shaft pin 21 is such that vertical movement of the tool beam means 28 or lateral movement thereof may be had, the connection being sufficiently loose to allow these movements. The tool beam means 28 includes a longitudinally extending portion 29 and a vertically extending stub beam portion 30. These two portions are connected together by means of triangularly shaped plates 31 and 32, as viewed more clearly in Figure 4.

On the lower end of the stub beam 30 is connected a plow bottom 33 having a wing or moldboard portion 34. This plow bottom is shaped to throw the plowed dirt to the right as the same is drawn through the ground. The longitudinal beam portion 29 is made fast to the triangular plates 31 and 32 by bolts 35, and, just rearwardly of these bolts and in the corner of the triangular plates, there extends laterally therethrough a transverse connecting sleeve member 36. Since the portion 29 does not extend rearwardly over the upper end of the stub beam 30, a pocket 37 is provided to allow the passage of the transverse sleeve member 36 between the plates 31 and 32. This transverse member is welded and retained against movement in the plates, as indicated at 38. The stub beam is pivotally connected between the plates 31 and 32 by a pivot bolt means 39, and, when the stub beam is in its working position, it is retained there by a bolt means 40 adapted to enter arcuate slots 41 and 42 in the respective plates 31 and 32. As a means for keeping the bolt means 40 laterally alined, there are provided at the outer sides of the triangular plates straps 43 and 44. These straps will keep the bolt means 40 alined so that, once the bolt means has left the arcuate slots upon the plow beam having struck an obstruction, the same will be maintained laterally for the easy return into the arcuate slots 41 and 42 without the necessity of the operator having to re-aline the bolt means with the slots. When the bolt means 40 is tightened sufficiently, the stub beam 30 will be held by friction and will only release when the most serious obstructions are met with. It should thus now be apparent that there has been provided means for releasing the plow bottom upon the same striking a head-on obstruction.

However, it so happens that the obstructions not only are encountered at the forward point but also from the side to exert a lateral force against the wing portion 34, and, without some means for making the plow bottom releasable in a lateral direction as well as rearwardly, destruction of the plow may still result. It is, therefore, the principal feature of the present invention to provide means which will release when undue lateral strains are encountered by the plow bottom. Such a laterally releasable means, when taken with the rearwardly releasable means, renders the plow structure and tractor free from harm when encountering an obstruction which places a force upon the same from substantially any direction.

Extending rearwardly from the rear axle structure 12 are the bracket members 45 and the bracing members 46 for retaining the bracket members in their proper vertical position. The bracket members 45 serve as a support for stabilizing means 47. This stabilizing means 47 includes a transversely extending rock-shaft 48 journaled in the bracket members 45, as indicated at 49 and 50, and has rearwardly extending arms 51 and 52 spaced therein with respect to each other. The arm 51 is made rigid with the shaft 48 while the arm 52 is adjustable with respect to the shaft by an adjusting means 53. This adjusting means, however, is sufficient to retain the arm fixed with respect to the shaft for making the same effective as a part of the stabilizer means.

Depending from the rearward ends of these arms 51 and 52 are supporting link means 54 and 55. Each of the links is connected to the arm by trunnion connections such that they are free to swing laterally with respect to the ends of the arms. The lower ends of the link means are connected to a shaft 56 extending through the transverse sleeve member 36, rigidly retained by the tool beam means 28. The shaft 56 may rotate about its axis in the sleeve, and the connection with the lower ends of the supporting link means is such as to permit freedom of transverse swinging movement of the respective link means. It should be apparent from the description thus far that the working tool and its tool beam may have lateral swinging movement with respect to the tractor.

However, it becomes necessary that the amount of this lateral swinging movement be limited and, as a means for limiting this movement, there is disposed between the respective supporting links 54 and 55, a diagonally arranged member 57 having a longitudinally extending slot 58 through which there extends a connecting pin 59. The upper end of the diagonal member 57 is connected to the link 55 by a bolt means 60, which can extend through any one of the holes 61 in the upper end of the diagonal member 57. It should thus be apparent that the amount of lateral movement is dependent upon the length of the slot 58. In normal operation, the pin 59 would remain substantially in the middle of the slot 58, but is allowed to move from one side to the other of this middle position. Under normal conditions, this amount of movement is sufficient and any small obstructions met with by the plow can be taken care of within this limit. These small obstructions are, however, never of sufficient magnitude to effect damage to the plow. It is thus with reference to the large obstructions that means necessarily must be provided for permitting release of the plow in a lateral direction.

The link means 55 is thus made up as a jointed member and has an upper section 55' and a lower section 55". Referring more particularly to Figures 5 and 6, it will be noted that these sections are pivotally connected together by a pivot bolt 62. The section 55" extends beyond the pivot bolt and has in its end a slot 63 adapted to receive the bolt means 60 upon the sections being alined vertically, as shown in Figure 5. When the bolt means 60 is sufficiently tightened, the sections of the link will be retained against angular movement with respect to each other by the friction engagement of the sections overlapping the faces of these sections. This friction is sufficient to render the two sections as substantially a single link means for all purposes under normal plowing conditions. When, however, an obstruction is met, placing great lateral force upon the wing portion 34 of the plow, the tendency is for the plow to move considerably to the left. If this force is sufficient, the pin 59 will engage the upper end of the slot 58 and push the diagonal member 57 and the bolt means 60 to the left sufficiently to cause the two sections 55' and 55" to break in their frictional engagement with one another. The bolt means 60 will leave the slot 63. This break in the sections will permit the plow beam to move to a great extent to the left, depending in amount upon the size of the obstruction. The release is sudden and is effective in ample time to prevent undue breakage of the plow or its connections with the tractor. After the obstruction is passed, the plow will, by gravity, take its original position, and the sections 55' and 55" will again be alined with one another. The bolt means 60 will then again be tightened and the sections will then become in effect a single link.

The stabilizing means 47, being connected at spaced points to the plow beam structure, will serve to maintain the plow bottom upright. The adjusting means 53 will serve to level the plow for the different plowing depths. The plow may have its depth controlled by a gauge means 65 fastened to the longitudinal beam 29 by a standard 66.

Depending from the shaft 48 and rigidly connected thereto is an arm 67, to the lower end of which is connected a sleeve 68 into which telescopes a lift rod 69 connected at its forward end to a lever 70 accessible to the operator's station 17 and adapted to be operated over a quadrant 71 fastened to the tractor. As the lever 70 is pulled rearwardly by the operator, the rod 69 will encounter a stop in the sleeve 68, and the stabilizing means 47 will be rocked in a clockwise direction. It will thus be apparent that the stabilizing means 47 serves as part of the lifting means to effect raising of the plow and beam to a transport position on the tractor.

In Figure 7 is shown a modified form of link means wherein there is provided a spring 72, which acts at all times to maintain the link sections 73 and 74 in proper vertical alinement. The pivotal connection between the link sections 73 and 74 is at 75, and the link section 74 has a projection 76 adapted to bear against the stop pin 77 on the link section 73. This stop pin 77 prevents the link sections from buckling over a dead center position toward the right. The lower end of the link section 73 has a laterally extending portion 78, while the lower end of the link section 74 has a laterally extending portion 79. These laterally extending portions 78 and 79 serve as a means to which the tension spring 72 can be connected to the link sections. The connection of the spring 72 to the laterally extending portion 78 may be adjustable, as indicated at 80. It should now be apparent that there has been provided a toggle link arrangement which serves as a swingable link means when the plow is working under normal conditions but is adaptable to release under abnormal conditions. These link sections 73 and 74 may take the position shown in dotted lines when the plow strikes an obstruction. With a spring arrangement such as now described, it will be apparent that the spring will always act to return the links to their normally alined positions and that it is, therefore, unnecessary to tighten any bolt means 60 such as with the form of the invention heretofore described.

It should now be apparent that there has been provided, in a plow adapted to be mounted on a tractor for vertical and limited transverse movement, means wherein portions of the plow structure and its connecting means are releasable in a transverse direction as well as in a rearward direction, and that the releasable means for permitting release of the plow structure in its transverse direction is incorporated in the stabilizing means.

While various changes may be made in the detail construction of the present invention, it should be understood that such changes shall be made within the spirit and scope of the present invention as defined by the appended claims.

What is claimed is:

1. In combination, a tractor, a plow beam having its forward end loosely connected to the tractor to thereby permit vertical and lateral movement with respect thereto, a plow bottom carried by the beam, lateral stabilizing means on the tractor connected to the plow beam and including a rockable member having laterally spaced arms, supporting link means connected for lateral swinging movement to each of said arms, means for limiting the amount of lateral movement, and releasable means in one of the supporting link means adapted to render the limiting means ineffective when the plow bottom strikes an obstruction.

2. In combination, a tractor, a plow beam having its forward end loosely connected to the tractor to thereby permit vertical and lateral movement with respect thereto, a plow bottom carried by the beam, means on the tractor for stabilizing the plow beam and bottom against lateral tilting movement and including a rockable member having laterally spaced arms, supporting link means connected for lateral swinging movement to each of said arms, means for normally limiting the amount of lateral swinging movement and one of the supporting link means including two sections adapted to be frictionally retained against lateral movement with respect to each other under normal plowing conditions but releasable when the plow bottom strikes an obstruction.

3. In combination, a tractor, a plow beam having its forward end loosely connected to the tractor to thereby permit vertical and lateral movement with respect thereto, a plow bottom carried by the beam, means on the tractor for stabilizing the plow beam and bottom against lateral tilting movement and including a rockable member having laterally spaced arms, supporting link means connected for lateral swinging movement to each of said arms, one of the supporting link means including two sections adapted to be frictionally retained against lateral movement with respect to each other under normal conditions, and diagonally arranged means connected between the supporting link means for normally limiting the amount of lateral swinging movement and serving to cause release of the frictionally retained sections when the plow bottom strikes an obstruction.

4. In combination, a tractor, a plow bottom, means for connecting the plow bottom to the tractor for lateral swinging movement including lateral stabilizing means having laterally spaced arms, link means connected to each of the arms for lateral swinging movement with respect thereto, means for limiting the amount of lateral movement under normal conditions, and means in one of the link means adapted to release when the plow bottom strikes an obstruction.

5. In combination, a tractor, a plow bottom, means for connecting the plow bottom to the tractor for lateral swinging movement including lateral stabilizing means having laterally spaced arms, link means connected to each of the arms for lateral swinging movement with respect thereto, means for limiting the amount of lateral movement under normal conditions, and one of said link means including a pair of toggle elements, and spring means for returning the elements and maintaining them in a normally alined relationship with respect to each other but releasable out of alinement when the plow bottom strikes an obstruction.

JAMES MORKOSKI.
ARTHUR G. EVANS.